United States Patent
O'Donnell et al.

(10) Patent No.: US 8,215,586 B2
(45) Date of Patent: Jul. 10, 2012

(54) EVACUATION SLIDE SYSTEMS

(75) Inventors: John O'Donnell, Brielle, NJ (US);
Frank Brown, Bayville, NJ (US);
Andreas Luethi, Jamesburg, NJ (US)

(73) Assignee: Air Cruisers Company, Wall, NJ (US)

( * ) Notice: Subject to any disclaimer, the term of this patent is extended or adjusted under 35 U.S.C. 154(b) by 336 days.

(21) Appl. No.: 12/384,703

(22) Filed: Apr. 8, 2009

(65) Prior Publication Data
US 2010/0258677 A1 Oct. 14, 2010

(51) Int. Cl.
*B64D 25/14* (2006.01)
(52) U.S. Cl. .................. 244/137.2; 182/48; 244/905
(58) Field of Classification Search ............... 244/137.1, 244/137.2, 905; 182/48
See application file for complete search history.

(56) References Cited

U.S. PATENT DOCUMENTS

| | | | |
|---|---|---|---|
| 2,936,056 A * | 5/1960 | Heyniger | 193/25 B |
| 3,554,344 A * | 1/1971 | Summer et al. | 193/25 B |
| 3,811,534 A * | 5/1974 | Fisher | 182/48 |
| 4,434,870 A * | 3/1984 | Fisher | 182/48 |
| 4,526,262 A * | 7/1985 | Malcolm | 193/25 B |
| 5,102,070 A | 4/1992 | Smialowicz et al. | |
| 5,875,868 A | 3/1999 | Smialowicz et al. | |
| 5,975,467 A | 11/1999 | O'Donnell et al. | |
| 6,298,970 B1 | 10/2001 | Targiroff et al. | |
| 6,536,715 B1 * | 3/2003 | Moran et al. | 244/137.2 |
| 6,641,445 B1 | 11/2003 | Jurlina et al. | |
| 6,644,596 B1 | 11/2003 | Jurlina et al. | |
| 6,814,183 B2 | 11/2004 | Horvath et al. | |
| 7,090,168 B1 | 8/2006 | Brown | |
| 7,789,761 B1 * | 9/2010 | Lumsden | 472/116 |
| 2003/0080254 A1* | 5/2003 | Alberts | 244/137.2 |

* cited by examiner

*Primary Examiner* — Peter R. Brown
(74) *Attorney, Agent, or Firm* — Dean W. Russell; Kilpatrick Townsend & Stockton LLP (57) ABSTRACT

Evacuation slide systems having extendable portions are detailed. The extendable portions of slides may be inflated separately from the main portions and actuated manually if desired. Consequently, attitude changes of, for example, an aircraft subsequent to inflation of the main portion of a slide would not necessarily defeat its use, as inflation of the extendable portion could still occur.

16 Claims, 10 Drawing Sheets

EVACUATION SLIDE SYSTEMS

FIELD OF THE INVENTION

This invention relates to evacuation equipment and more particularly, although not necessarily, to extendable slides for use in evacuating aircraft.

BACKGROUND OF THE INVENTION

Inflatable slides for evacuating, in particular, commercial fixed-wing aircraft are well known. Such slides typically are stowed on-board aircraft in uninflated states and mounted on, in, or near exit doors. When the doors are opened in particular manners (as in emergency situations), the slides are designed to inflate automatically for use by passengers and crew in exiting the craft. The slides are especially useful when a passenger cabin is substantially higher than the ground or other surface on which the aircraft rests, as otherwise passengers might be required, at their peril, to jump from the cabin (or wings) of the aircraft to the resting surface.

Descent speed of persons using an evacuation slide is, at least in part, a function of the angle ($\alpha$) formed between the slide and the resting surface. Shallow angles may slow descent speeds below desired minimums, resulting in unacceptably-long evacuation times. Steep angles too may be unacceptable, either increasing descent speeds above desired maximums (thus increasing possibility of injuries to persons using the slides) or causing persons to refuse to use the slides entirely.

Static measurements may be made to assist designers in determining suitable lengths of inflated slides. For example, for an aircraft at rest on the ground with its landing gear deployed, the vertical distance between the ground and an exit door may readily be measured. By selecting a particular value for angle $\alpha$, the designer readily may calculate, for this static case, the minimum slide length necessary for the slide to contact the ground.

Unfortunately, however, need to use an aircraft evacuation slide may arise in situations other than as described above. Failure of landing gear either to deploy or to support an aircraft could, for example, change the attitude of the aircraft such that one or more exit doors are higher (or lower) than in the static case. Similarly, if the resting surface of the aircraft is not uniformly horizontal, vertical heights of exit doors above the resting surface may differ from their norms. Yet additionally rupture and, for example, roll of the fuselage could increase beyond normal the height of some doors above even a level resting surface. As a consequence, a slide whose length has been selected based on static conditions may be of inadequate length when deployed for actual use.

U.S. Pat. No. 6,814,183 to Horvath, et al. seeks to resolve this issue by providing an extendable evacuation slide "deployable in either a foreshortened or lengthened configuration." See Horvath, Abstract, ll. 2-3. Deployment configuration is determined automatically, so that it "does not rely on manual actuation or physical measurement of the distance to the ground." See id., col. 2, ll. 28-29. Instead, an "electronic sensor such as an inclinometer" informs a control circuit as to "whether the aircraft is in a horizontal attitude, a nose down attitude or some other attitude." See id., ll. 48-49; col. 5, ll. 6-8. Should the control circuit indicate the slide should be extended, a pyrotechnic cable cutter may be used to release the extendable portion of the slide. See id., Abstract, ll. 7-10.

Deployment state of the system of the Horvath patent is determined upon initial deployment. Stated differently, only one deployment decision is made based on information from the inclinometer: Either only the main section of the slide is inflated or both the main and extendable portions are inflated together. Consequently, if the signal from the inclinometer is erroneous (either electrically or practically), the extendable portion may inflate undesirably with no opportunity for correction.

For example, some evacuations follow collapse of the main (rearward) landing gear of aircraft, which event may lead to a phenomenon known as "tail tipping." Such a tail tip subsequent to the inclinometer sensing aircraft attitude could adversely impact operation of the automatic system of the Horvath patent toward the rear of the aircraft. If the control circuit determines that both the main and extendable portions of the slide at a rear door should be inflated, they will do so together. However, any subsequent tipping of the aircraft tail could render the slide length too long for satisfactory use by passengers—i.e. the increased length would make angle $\alpha$ less than desired—with no way to prevent inflation of the extendable portion or automatically deflate it. By contrast, if only the main portions of slides at the forward doors are inflated based on the inclinometer readings, the subsequent tail tip may render them too short for use (i.e. angle $\alpha$ would be greater than desired) with no opportunity for extension.

Because the main and extendable portions of the slide of the Horvath patent are configured to be inflated together when signaled, no bulkhead or other mechanical fluid-interruption device is incorporated into the tubes of the slide. Instead, the extendable portion of the slide is laced into a pouch positioned at an end of the main portion, with the pyrotechnic cable cutter severing the lacings if extension is signaled to occur. As the lacings are external to the slide, however, they conceivably could be severed unintentionally (and undesirably) by sharp debris or heat. Need thus exists for extendable evacuation slides in which inflation of extendable portions occurs separately from inflation of the main portions and which are configured both to limit possibility of simultaneous inflation of the portions and to reduce possibility of the slides extending when not desired.

SUMMARY OF THE INVENTION

Systems of the present invention meet this need. Unlike slides of the Horvath patent, those of the present invention permit extendable portions to be inflated separately from main portions. Further, inflation of the extendable portions may occur following manual actuation. As a consequence, aircraft attitude changes subsequent to inflation of the main portion of a slide would not necessarily defeat its use, as a crew member (or passenger) may either thereafter cause inflation of the extendable portion or take no manual action, so that only the main portion inflates, as appropriate.

Although the extendable portions of the slide may be inflated separately from the main portions, they nevertheless may be integrally formed. Such integral formation may result in seamless tube structure of greater beam strength and reduced weight compared with alternative designs. Bulkheads may be positioned within the tubes between the main and extendable portions to block fluid flow from one to the other. Avoiding seams in the slide surfaces may allow users to retain their speeds of descent while transitioning from the main to the extendable portions.

An additional aspect of the present invention may include utilizing separate inflation systems for the main and extendable portions of the slides, with distinct fluid reservoirs, hoses, and aspirators being assigned to each. A quick release system for the extendable portion may facilitate stowage and restraint of that portion when unneeded. Lacings or snaps may, if desired, form part of the quick release system. Also, the floor of the extendable portion itself may be made of material selected so that no separate protective cover is needed.

It thus is an optional, non-exclusive object of the present invention to provide extendable evacuation slides principally, although not exclusively, for aircraft.

It is another optional, non-exclusive object of the present invention to provide evacuation slides having separately inflatable main and extendable portions.

It is also an optional, non-exclusive object of the present invention to provide evacuation slides in which inflation of an extendable portion may be actuated manually.

It is a further optional, non-exclusive object of the present invention to provide evacuation slides in main and extendable portions that may be integrally formed.

It is, moreover, an optional, non-exclusive object of the present invention to provide evacuation slides in which internal bulkheads prevent fluid flow between the main and extendable portions.

It is an additional optional, non-exclusive object of the present invention to provide evacuation slides in which a quick release system may be used for the extendable portion.

Other objects, features, and advantages of the present invention will be apparent to those skilled in the appropriate fields with reference to the remaining text and the drawings of this application.

DETAILED DESCRIPTION

Illustrated in FIGS. 1-4 is slide system 10 consistent with the present invention. System 10 includes at least one inflatable evacuation slide 14. System 10 also may include conventional (or other) equipment for inflating slide 14, examples of which include compressed gas cylinders, gas-generating pyrotechnic devices, and combinations of these types.

Figure 1:
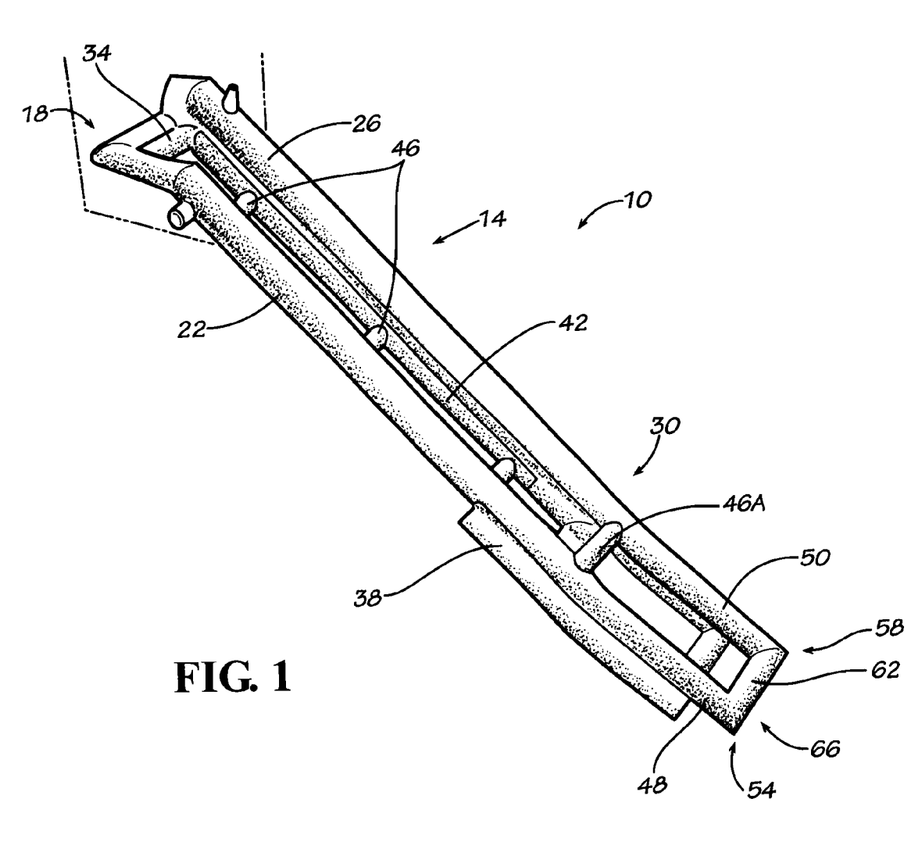
FIG. 1 is an isometric view of an exemplary evacuation slide system of the present invention.

Head end 18 of slide 14 typically is secured to the aircraft or other structure from which it depends. A girt may be used to effect this securing, although other attachment means conceivably could be used instead. Generally, though, for use in connection with an aircraft, slide 14 is positioned so that head end 18 is connected at or adjacent an exit of the aircraft (e.g. a door or, possibly, a window).

Slide 14 may include a main portion 20 comprising at least two inflatable upper tubes 22 and 26. The upper tubes 22 and 26, when inflated, are generally parallel and may extend from head end 18 to foot end 30. One or more inflatable transverse tubes 34 may be placed between upper tubes 22 and 26, both to space the tubes 22 and 26 and to provide greater torsional stability to slide 14 when deployed. Included among these transverse tubes is one (labelled 34A) positioned near foot end 30 of tubes 22 and 26. Panels also may extend between upper tubes 22 and 26 to provide sliding surfaces for persons utilizing slide 14.

Lower tubes, such as tubes 40 and 42, may (when inflated) help support upper tubes 22 and 26 of slide 14. Lower tubes 40 and 42 preferably extend parallel to upper tubes 22 and 26 and are inflated together with the upper tubes 22 and 26. Lower tubes 40 and 42 also may be spaced by one or more transverse tubes 46, of which several are shown in FIG. 1. Of course, other support structures additionally may be employed as appropriate or desired.

Figure 2:
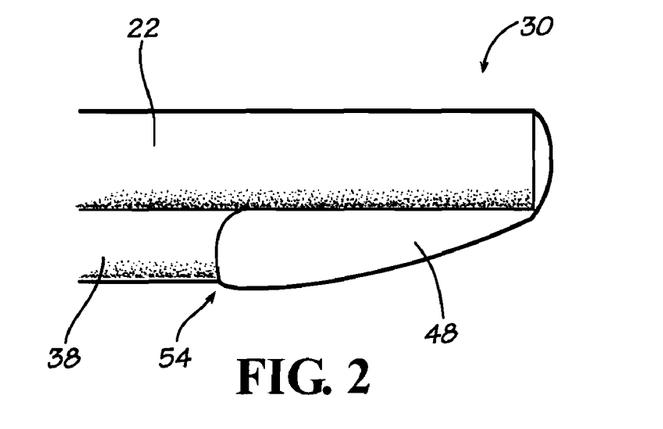
FIG. 2 is a generally side view of a portion of the slide system of FIG. 1 shown with a slide in an unextended state.

Depicted in FIG. 1-2 is extension portion 37 comprising upper extension portions 48 and 50 of, respectively, upper tubes 22 and 26 and lower extension tubes 38 and 39. Upper extension portions 48 and 50 preferably are integral continuations of respective upper tubes 22 and 26. They preferably are inflated separately from upper tubes 22 and 26, however. Indeed, in some embodiments of system 10, extension portions 48 and 50 have dedicated inflation systems including, for example, dedicated gas reservoirs, hoses, and aspirators. Generally gas-impervious bulkheads (such as bulkhead 52 shown in broken lines in FIG. 4) present within the tubes may be used to divide upper tubes 22 and 26 from the upper extension portions 48 and 50, permitting separate inflation of the upper extension portions 48 and 50. Transverse tube 34A preferably is of reduced height as compared to other tubes 34, reducing the possibility of disrupting progress of persons as they slide onto the extended part of slide 14.

As illustrated in FIG. 2, extension portion 37, when not inflated, may fold underneath upper tubes 22 and 26 back toward head end 18. If appropriate, distal end 54 of extension portion 37 may be connected to main portion 20 (as, for example, by a quick release mechanism) when extension portion 37 is uninflated. Upon inflation, however, extension portion 37 unfolds so that distal end 54 extends away from head end 18, beyond foot end 30 of upper tubes 22 and 26. Consequently, extension portion 37 thus, upon inflation, increases the useful length of main portion 20 of slide 14.

Figure 3:
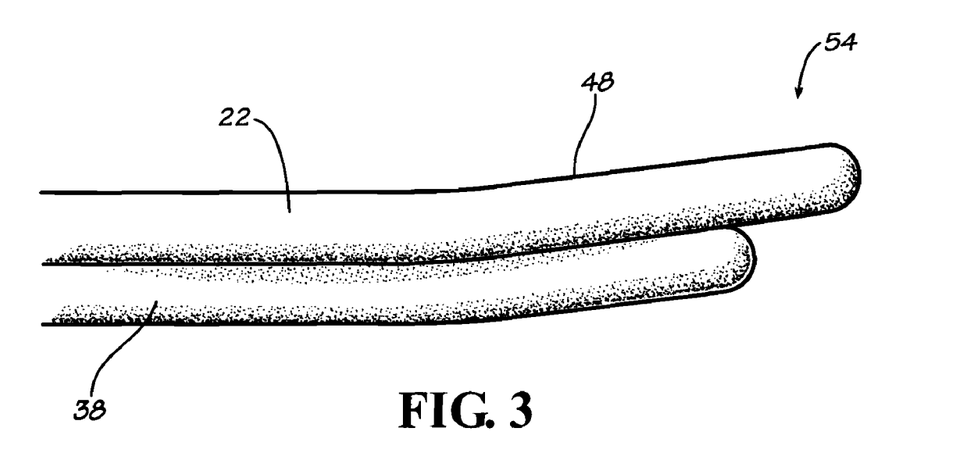
FIG. 3 is a generally side view of a portion of the slide system of FIG. 1 shown with the slide in an extended state.
Figure 4:
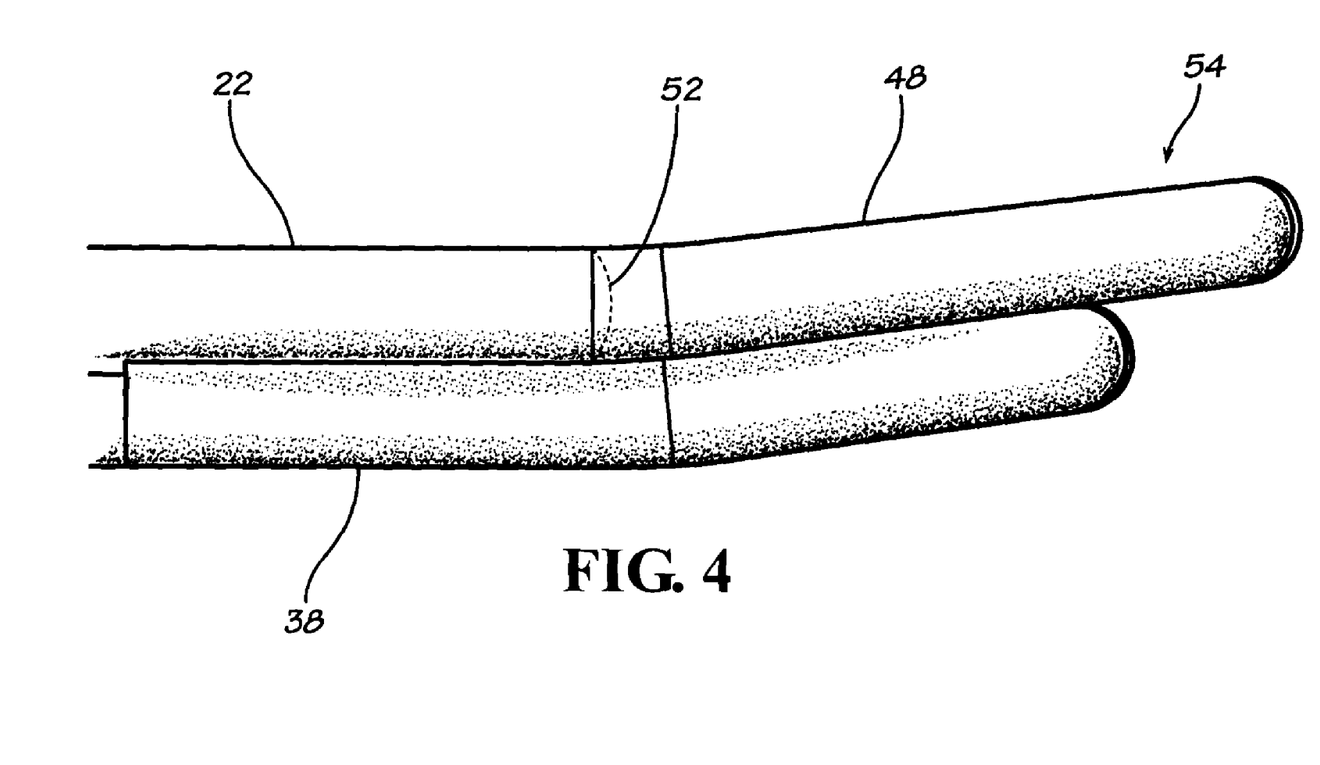
FIG. 4 is a cross-sectional view similar to FIG. 3 showing, in broken lines, an internal bulkhead useful as part of the slide system of FIG. 1.

FIG. 1 depicts a transverse tube 62 connecting upper extension portions 48 and 50 at extended foot end 66 (see also FIG. 3). A similar transverse tube 41 may connect lower extension tubes 38 and 39. Inflatable components of extension portion 37 preferably are inflated together should the length of slide 14 need to be extended.

Shown in FIGS. 5A-B, 6A-B, and 7A-B is alternate exemplary slide system 110 consistent with the present invention. System 110 may include at least one inflatable evacuation slide 114 as well as equipment for inflating the slide 114. Like head end 18 of slide 14, head end 118 of slide 114 may be secured to the aircraft or other structure from which it depends when deployed.

Main portion 120 of slide 114 preferably comprises at least two inflatable upper tubes 122 and 126 extending from head end 118 to foot end 130. When inflated, at least portions of tubes 122 and 126 are generally parallel (as depicted in FIGS. 5A-B and 7A-B). One or more transverse tubes 134 may be placed between tubes 122 and 126 as both spacers for the tubes and torsional stabilizers for slide 114 when deployed. In the version of system 110 illustrated in FIG. 5A, one transverse tube (labelled 134A) is present at or near foot end 130, while another such tube 134 is present at or near head end 118. One or more panels 121 (see FIG. 8) also may extend between upper tubes 122 and 126 to provide sliding surfaces for persons utilizing slide 114.

Figure 5A:
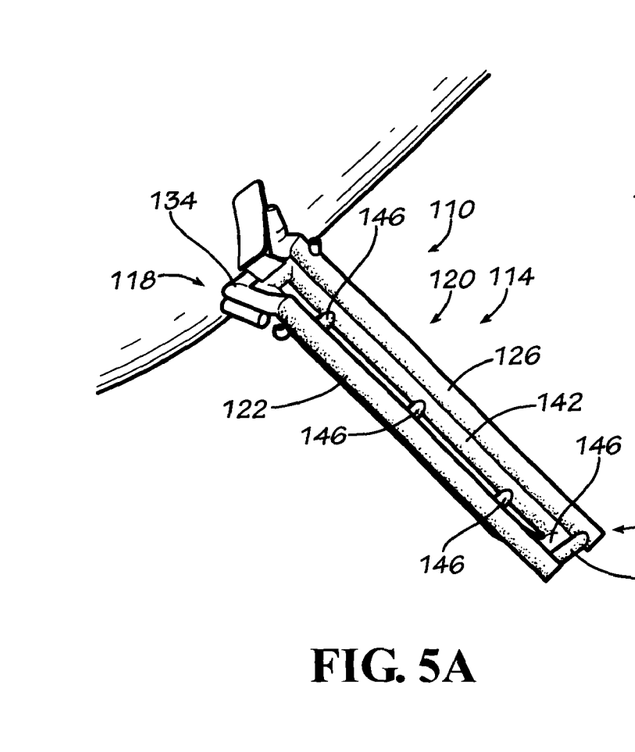
FIGS. 5A-B, 6A-B, and 7A-B present various views of an alternate evacuation slide system of the present invention, with each of the "A" drawings illustrating a slide in an unextended state and each of the "B" drawings illustrating the slide in an extended state.

Main portion 120 may also include one or more (and preferably two or more) lower tubes 140 and 142. Lower tubes 140 and 142 may help support upper tubes 122 and 126 and preferably extend generally parallel thereto. Likewise, lower tubes 140 and 142 preferably are inflated together with the upper tubes 122 and 126. One or more transverse tubes 146 may connect (and thereby space) lower tubes 140 and 142.

Figure 5B:
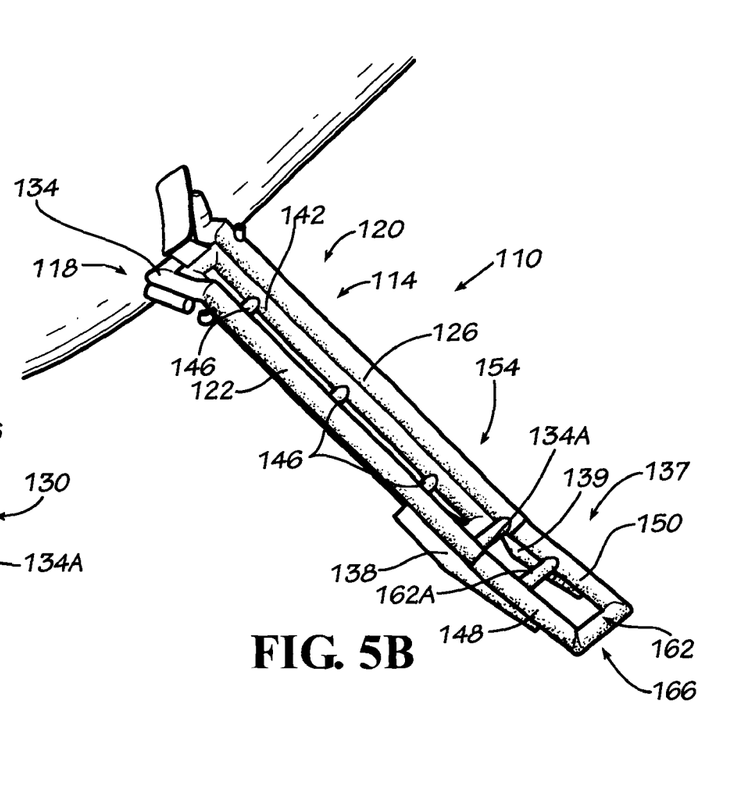
Figure 6A:
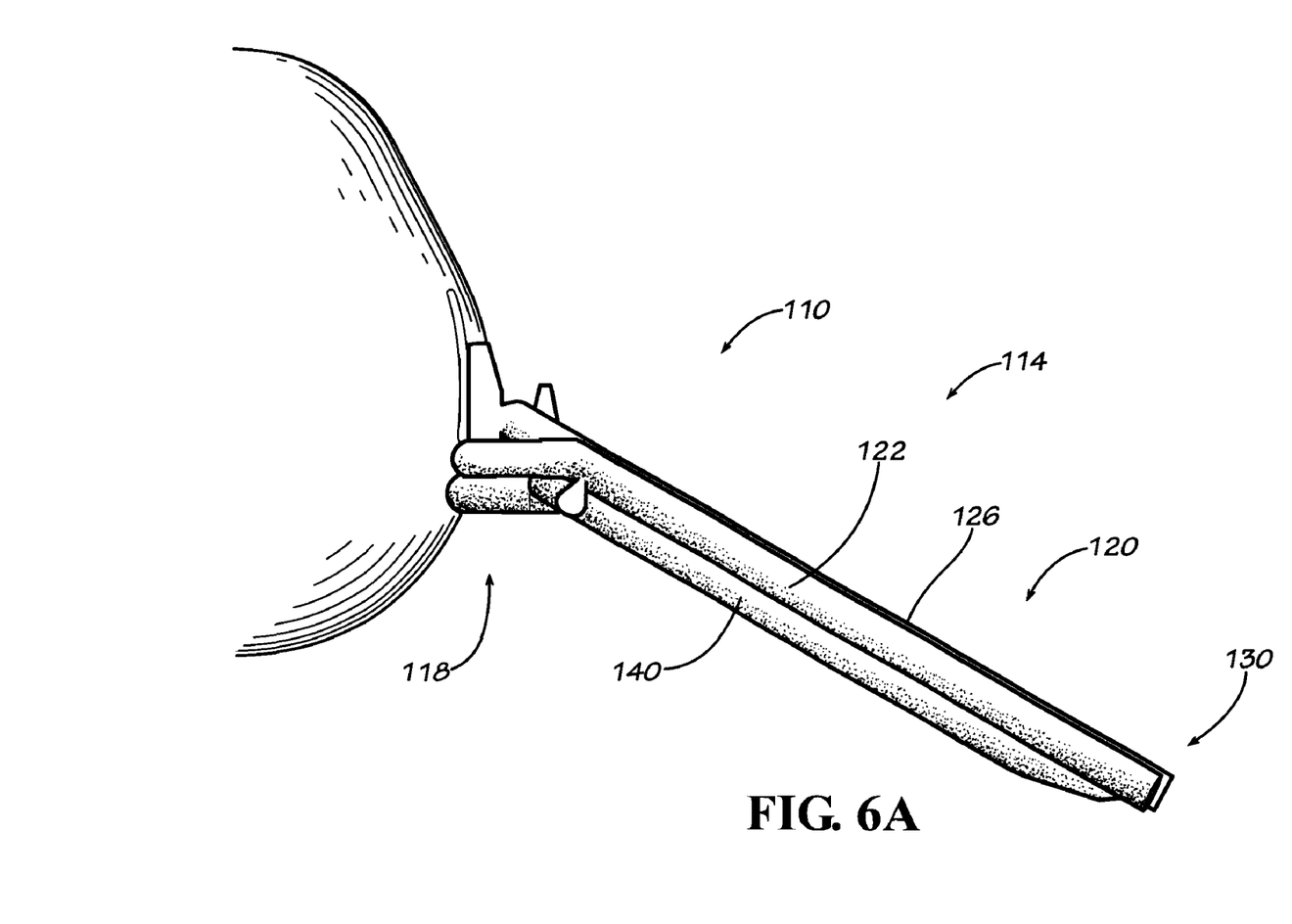
Figure 6B:
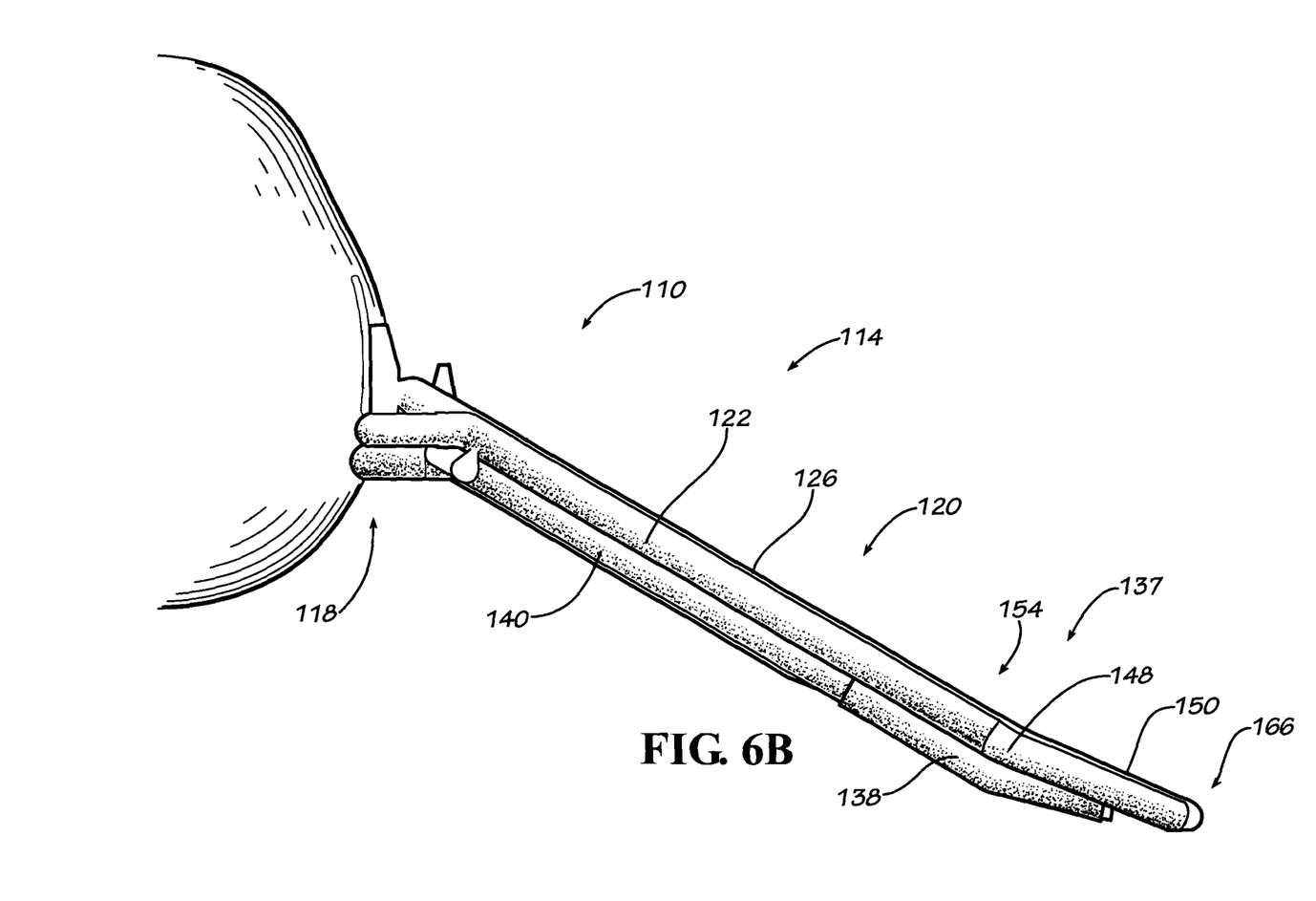
Figure 7A:
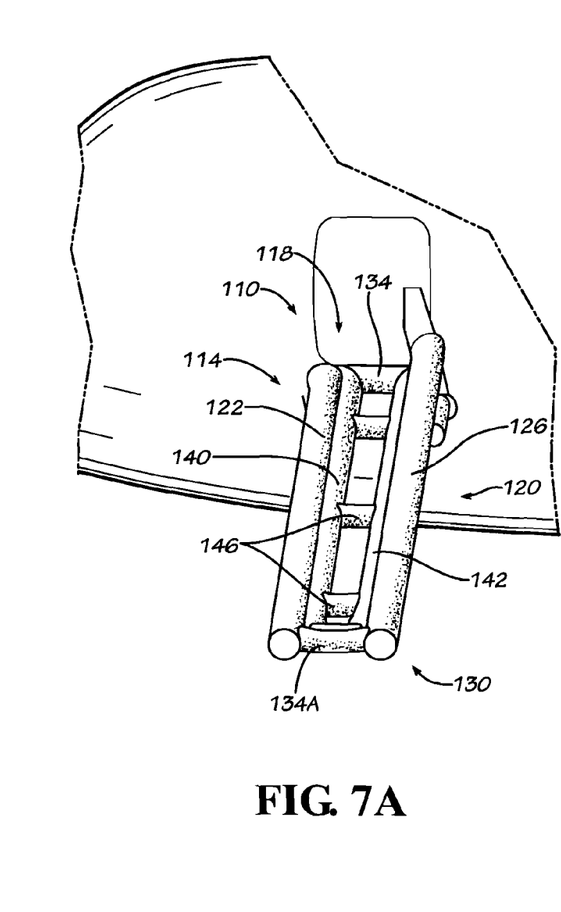
Figure 7B:
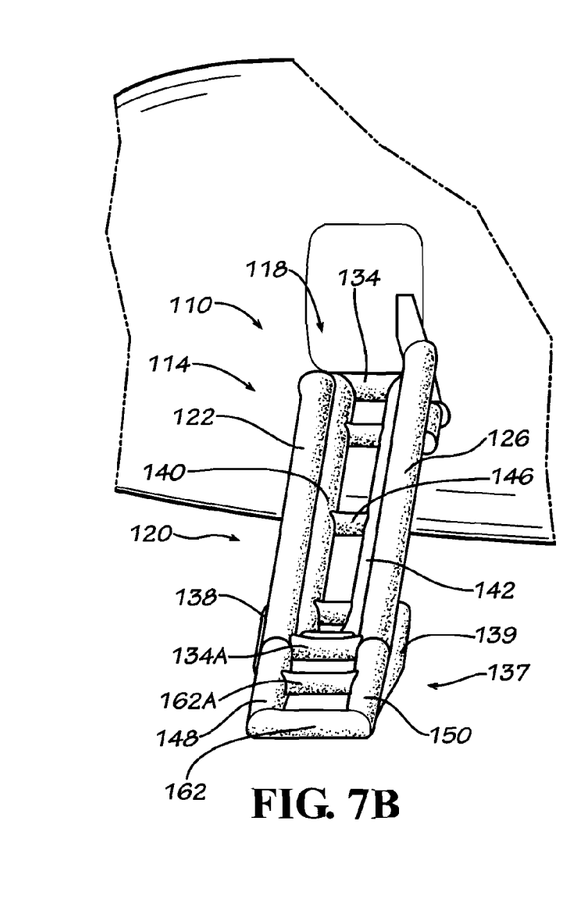

Depicted in FIGS. 5B, 6B, and 7B is slide system 110 in its extended state. Slide 114 includes extension portion 137 comprising upper extension portions 148 and 150 of, respectively, upper tubes 122 and 126 as well as lower extension tubes 138 and 139. One or more panels preferably extend between upper extension portions 148 and 150 as well to provide sliding surfaces for persons utilizing slide 114 in its extended state.

Extension portion 137 additionally may define or comprise distal end 154, extended foot end 166, and one or more transverse tubes 162 connecting upper extension portions 148 and 150. As illustrated especially in FIGS. 5B and 7B, at least one version of extension portion 137 includes a transverse tube 162 at or adjacent extended foot end 166 and another (labelled 162A) between distal end 154 and extended foot end 166.

Unlike lower extension tubes 38 and 39 of FIG. 1, lower extension tubes 138 and 139 preferably taper inward toward extended foot end 166, thus resembling certain type of fork tines. They additionally may lack any transverse tube near extended foot end 166. Those skilled in the appropriate field will, however, recognize that extension portion 137, and any portion of it, may be configured differently than is illustrated in FIGS. 5B, 6B, and 7B.

Upper extension portions 148 and 150 preferably are (but need not necessarily be) integral continuations of respective upper tubes 122 and 126. Again, though, upper extension portions 148 and 150 preferably are inflated separately from upper tubes 122 and 126. They preferably are, however, inflated together with all other inflatable components of extension portion 137. If upper extension portions 148 and 150 are continuations of but inflated separately from upper tubes 122 and 126, bulkheads (such as generally gas-impervious bulkhead 52 of FIG. 4) may be present as dividers.

Either or both of transverse tubes 134A and 162A beneficially may be of reduced height as compared to one or more of the other tubes 134 and 162. This height reduction reduces the possibility of tubes 134A and 162A disrupting progress of persons as they slide onto extension portion 137 of slide 114. By contrast, any panel extending across upper extension portions 148 and 150 adjacent extended foot end 166 may include a urethane coating or other friction-increasing agent so as to decelerate sliding passengers approaching extended foot end 166.

Figure 8:
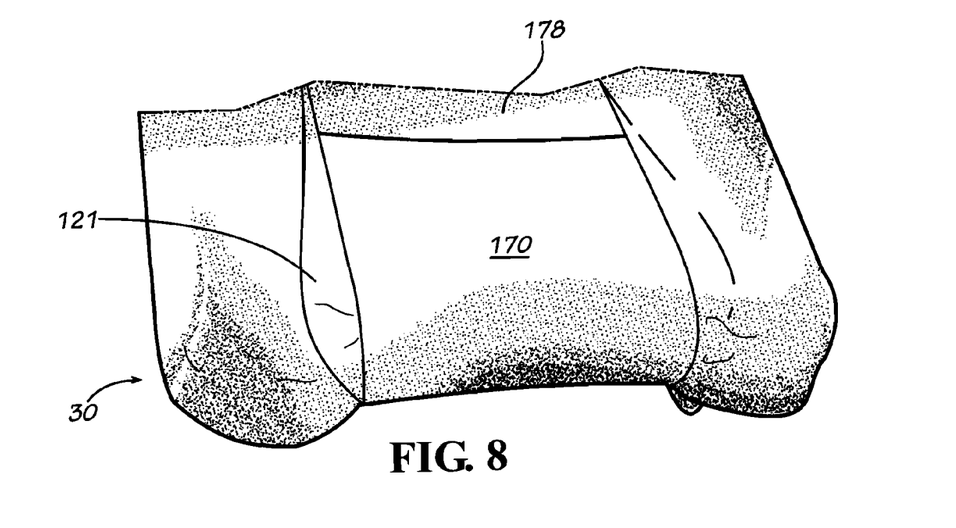
FIG. 8 illustrates a containment wrapper as configured in the (unextended) slide system of FIG. 5A.
Figure 9:
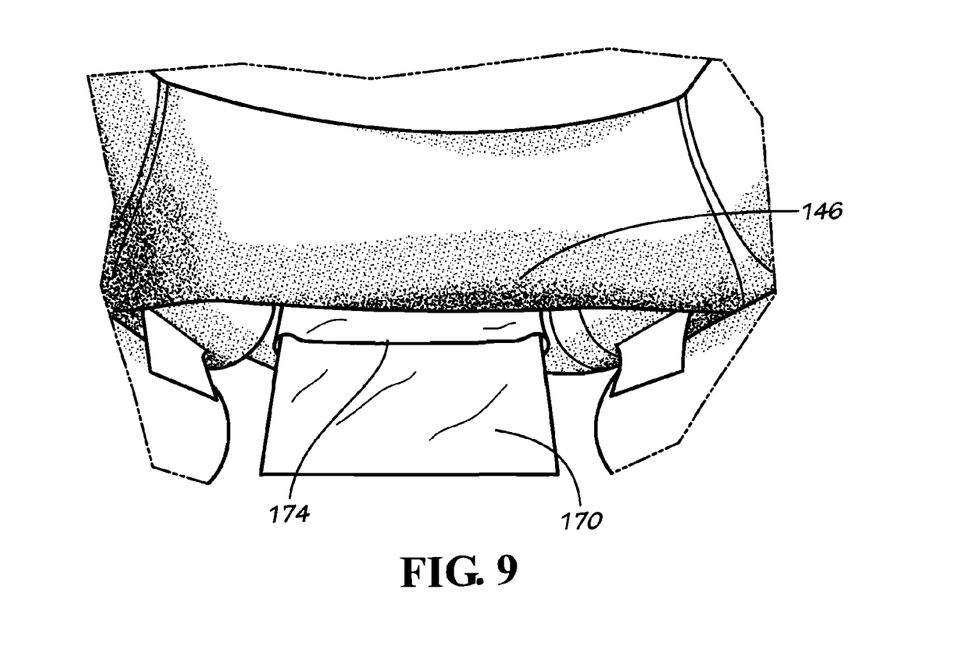
FIG. 9 illustrates the containment wrapper of FIG. 8 as configured in the (extended) slide system of FIG. 5B together with a transverse tube of the extension portion of the system.

Illustrated in FIGS. 8-9 is, among other things, containment wrapper 170. Wrapper 170, which may comprise fabric or any other flexible material, functions to assist in retaining extension portion 137 in place relative to the remainder of slide 114 when not deployed. First end 174 of at least part of wrapper 170 may be relatively permanently attached to a transverse tube 146 or other portion of the understructure of main portion 120. By contrast, second end 178 is attached to panels 121, so that at least part of wrapper 170 wraps around foot end 30 as shown in FIG. 8. Folding or packing (uninflated) extension portion 137 adjacent or within main portion 120 thus permits wrapper 170 to retain it in place. In this situation depicted in FIG. 8, wrapper 170 itself may be coated with urethane or otherwise made or modified so as to increase its frictional resistance to motion of sliding passengers.

Attachment of second end 178 to panels 121 preferably is not permanent—i.e. second end 178 may be removed from panels 121 upon application of suitable force. As a consequence, as extension portion 137 inflates, second end 178 detaches from panels 121 to allow slide 114 to expand to its extended state. Because first end 174 remains attached to understructure of main portion 120, following detachment second end 178 may dangle below slide 114 (see FIG. 9) and thus avoid creation of any impediment to persons utilizing the slide 114 for evacuation purposes.

Figure 10A:
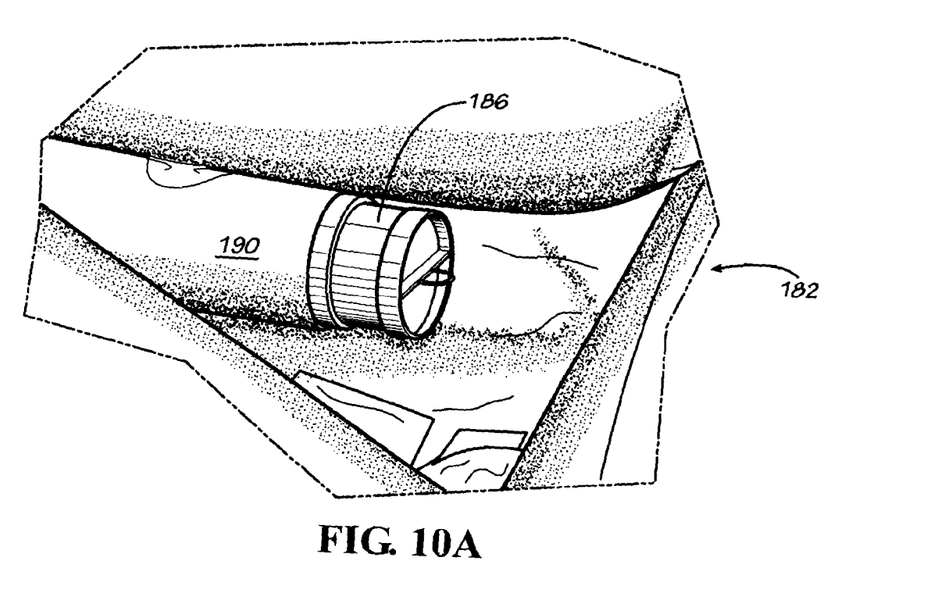
FIGS. 10A-C illustrate portions of the inflation system for the extension portion of the system of FIG. 5B.
Figure 10B:
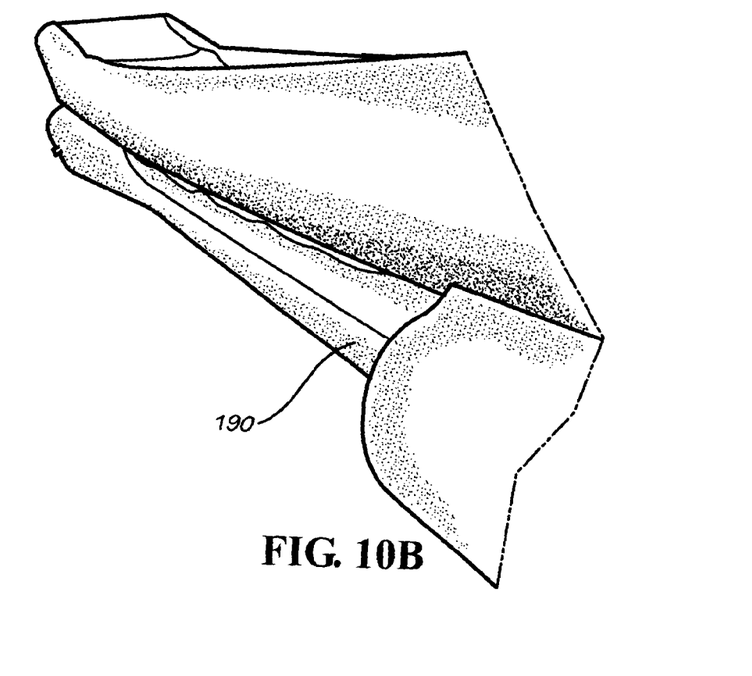
Figure 10C:
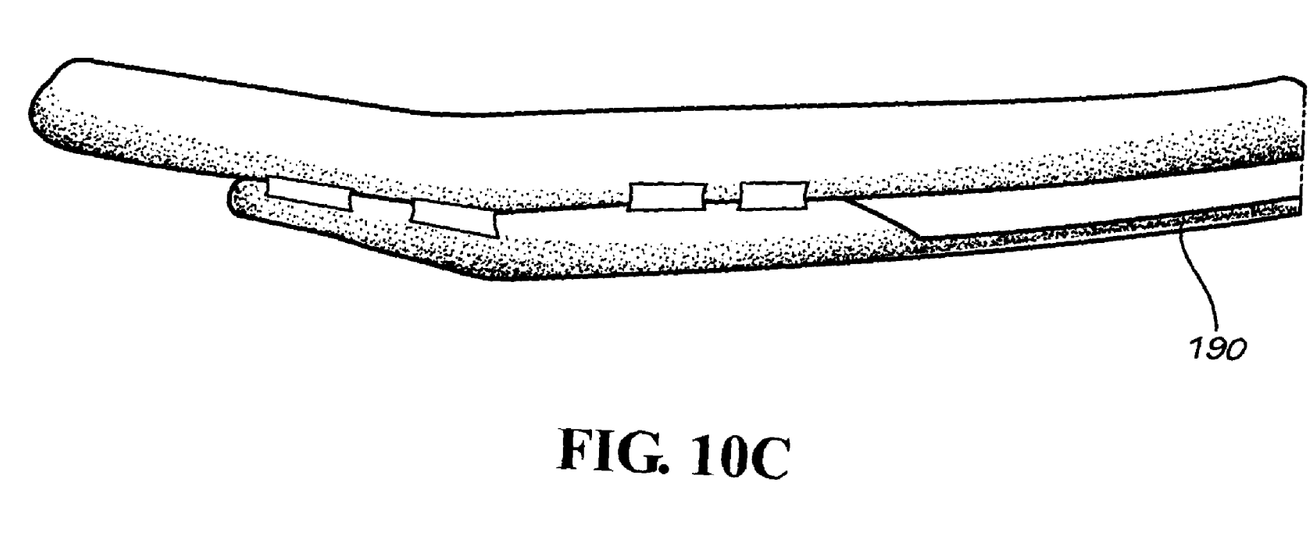

FIGS. 10A-C, finally, depict aspects of inflation system 182 for extension portion 137. System 182 may comprise at least aspirator 186 and "snorkel" or inflation tube 190. Aspirator 186 beneficially may be positioned near head end 118 of slide 114 and receive pressurized fluid (e.g. air) from a source thereof when extension portion 137 is to be deployed. Because both aspirator 186 and extension portion 137 communicate with tube 190, pressurized fluid passing through the aspirator 186 travels within the tube 190 to extension portion 137 so as to inflate it. Further, because some of the fluid will remain within tube 190 (thus inflating it too), the diameter of tube 190 preferably is substantially smaller than the maximum diameter of, for example, any of upper extension portions 148 or 150 or lower extension tubes 138 or 139.

The foregoing is provided for purposes of illustrating, explaining, and describing embodiments of the present invention. Modifications and adaptations to these embodiments will be apparent to those skilled in the art and may be made without departing from the scope or spirit of the invention. For example, although various elongated structures are referred to herein as "tubes," they need not necessarily have circular transverse cross-section. Additionally, the contents of the Horvath patent are incorporated herein in their entirety by this reference.

What is claimed is:

1. An evacuation slide system comprising:
    a. an inflatable slide comprising:
        i. a main portion having a length;
        ii. an extension portion integrally formed with the main portion so as to extend the length thereof when inflated without creating an external seam at a boundary of the main and extension portions; and
        iii. at least one internal bulkhead generally precluding fluid communication between the main portion and the extension portion; and
    b. means for inflating the extension portion separately from the main portion.

2. An evacuation slide system according to claim 1 in which the inflating means comprises (a) an automatic actuator for inflating the main portion and (b) a manual actuator for inflating the extension portion after inflation of the main portion.

3. An evacuation slide system according to claim 1 in which the main portion comprises a first upper tube and the extension portion comprises an integral continuation of the first upper tube.

4. An evacuation slide system according to claim 3 in which the bulkhead is positioned within the first upper tube so as to define the boundary.

5. An evacuation slide system according to claim 4 in which the extension portion, when uninflated, folds adjacent the main portion.

6. An evacuation slide system according to claim 5 in which the main portion has a head end configured for attachment to an aircraft and a foot end adjacent the extension portion and further comprises:
   a. a second upper tube;
   b. a first transverse tube between the first and second upper tubes; and
   c. a second transverse tube between the first and second upper tubes and adjacent the foot end.

7. An evacuation slide system according to claim 6 in which the main portion further comprises first and second lower tubes supporting and extending generally parallel to the first and second upper tubes, respectively.

8. An evacuation slide system according to claim 7 in which the extension portion further comprises first and second lower extension tubes.

9. An evacuation slide system according to claim 8 in which the extension portion (a) defines an extended foot end and (b) further comprises a third transverse tube.

10. An evacuation slide system according to claim 9 further comprising a containment wrapper attached to the main portion, the containment wrapper functioning to assist in retaining the extension portion in a predetermined position relative to the main portion prior to deployment of the extension portion.

11. An evacuation slide system according to claim 10 in which the containment wrapper comprises first and second ends, at least one of which is removably attached to the main portion.

12. An evacuation slide system according to claim 11 further comprising a passenger-sliding surface, comprising at least one panel, extending between the first and second upper tubes.

13. An evacuation slide system according to claim 12 in which the first end of the containment wrapper is removably attached to the panel.

14. An evacuation slide system according to claim 13 in which the inflation means further comprises an aspirator and an inflation tube communicating therewith.

15. An evacuation slide system according to claim 14 in which the inflation tube also communicates with the extension portion so as to convey inflation fluid thereto.

16. An evacuation slide system according to claim 12 in which at least portions of both the containment wrapper and the passenger-sliding surface are coated with the same friction-increasing agent so as to decelerate sliding passengers in approximately the same manner.

* * * * *